United States Patent [19]

Heinz

[11] Patent Number: 4,997,375
[45] Date of Patent: Mar. 5, 1991

[54] ELASTICALLY INTERCONNECTED ARTICULATED BLOCKS

[76] Inventor: Ted L. Heinz, 33694 Colgate Ave., Union City, Calif. 94587

[21] Appl. No.: 451,813

[22] Filed: Dec. 18, 1989

[51] Int. Cl.⁵ ............................................. A63H 33/00
[52] U.S. Cl. .................................. 434/403; 446/119; 446/487
[58] Field of Search ................ 434/403; 446/119, 486, 446/487, 490

[56] References Cited

U.S. PATENT DOCUMENTS

| | | | |
|---|---|---|---|
| 1,201,710 | 10/1916 | Finch | 446/119 |
| 2,825,178 | 3/1958 | Hawkins | 446/119 |
| 3,222,072 | 12/1965 | Dreyer | 446/119 |
| 3,514,893 | 6/1970 | Paksy | 446/486 |
| 3,577,673 | 5/1971 | Monestier | 446/490 |
| 3,597,872 | 8/1971 | Vennola et al. | 446/490 |
| 4,305,582 | 12/1981 | Barton | 446/486 X |
| 4,466,799 | 8/1984 | Argiro | 434/403 X |

OTHER PUBLICATIONS

Playthings, "Tacoma Toy Firm Begins National Distribution of New Building Toy", May 1960, p. 75.

Primary Examiner—Richard J. Apley
Assistant Examiner—Rachel M. Healey
Attorney, Agent, or Firm—Linval B. Castle

[57] ABSTRACT

Elastic cord interconnected blocks in which each block contains a plurality of deep slots cut to a centrally positioned interior washer-like connecting element having a hole coaxial that can freely pass the elastic cord. The element hole is coaxial with an axial hole formed in the block by the spacing of adjacent block segments, the segment having a spacing for passing a stretched elastic cord and for locking the cord in its relaxed state. Unusual shapes can be formed with several interconnected blocks.

6 Claims, 2 Drawing Sheets

ELASTICALLY INTERCONNECTED ARTICULATED BLOCKS

BRIEF SUMMARY OF THE INVENTION

This invention relates generally to serially interconnected polyhedrons and particularly to educational toys that may be articulated to form various designs and geometrical patterns. Larger versions of the elastically interconnected blocks may be used as flexible arms for lamps, robotic arms, etc.

Many different concepts for elastically interconnected blocks have been developed. For example, U.S. Pat. No. 2,825,178 describes one form in which a plurality of substantially identical blocks with cross slots or kerfs at each end are interconnected with an elastic strand extending longitudinally through the bore. U.S. Pat. No. 3,597,872 describes a toy in which a plurality of blocks, each with angled end surfaces, are interconnected with an elastic strand running through the bore between the end surfaces to form unusual angled snake-like shapes. Other designs have been developed, nearly all describing an elastic strand in the longitudinal bore of the block and with various end slots into which the strand may be fit.

The blocks of the present invention have a plurality of longitudinal slots for the passage of an elastic strand, and both end surfaces contain similar slots that pass from the center of the end surface to connect with the longitudinal slots. Thus, if the block were cubical, slots crossing through the center of one end surface will continue longitudinally along the four side surfaces to meet the slots crossing through the center of the opposite end surface.

To obtain such a slot arrangement, each block may be formed of a plurality of identical longitudinal segments, each cemented to a toroidal washer-like connecting element at its interior center and each separated from its adjacent segment by a space representing the diameter of the elastic strand passing slot. The connecting element has a central hole with a diameter somewhat greater than the width of the slots so that the elastic strand, having a larger diameter in its relaxed state, will readily pass through the hole but will be confined within the slots in the block unless it is stretched. An alternate method of obtaining a block with such a slot arrangement is to form identical upper and lower halves of a block, divided through the block equator with the segments in each half secured to a split half of a connecting element. The two halves may then be joined to form a complete block.

BRIEF DESCRIPTION OF THE DRAWINGS

In the drawings which illustrate the preferred embodiment of the invention.

DETAILED DESCRIPTION OF THE PREFERRED EMBODIMENT

Figure 1:
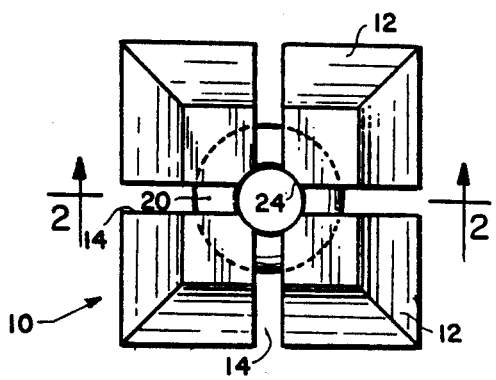
FIG. 1 is a plan view of a slotted block showing, in section, the interior connecting element.

Illustrated in the plan view of FIG. 1 is a cubical block 10 having 45° bevelled top and bottom edges 12, thus forming a fourteen sided polyhedron. Across the top and bottom surfaces of the block are slots 14 that intersect with slots in the four side surfaces of the block, the slots being sufficiently deep to completely cut and separate the block 10 into four individual quarters.

Figure 2:
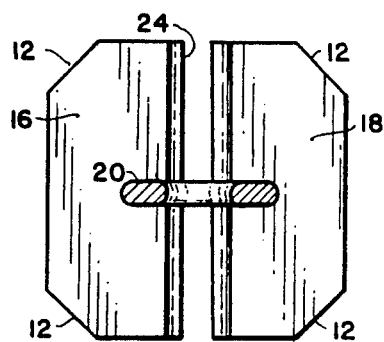
FIG. 2 is an elevational view taken along the lines 2—2 of FIG. 1.

FIG. 2 is an elevational view illustrating two of the separated quarters 16, 18 of the block 10 and a connecting element 20. A lateral slot normal to the interior corners is formed near the center of each quarter, and into this interior slot is cemented a washer-like connecting element 20 which is preferably formed of metal or stiff fiber. Each of the four quarters of the block 10 is thus secured on the element to form a single unit block the quarters of which are firmly joined only by the connecting element.

Figure 3:
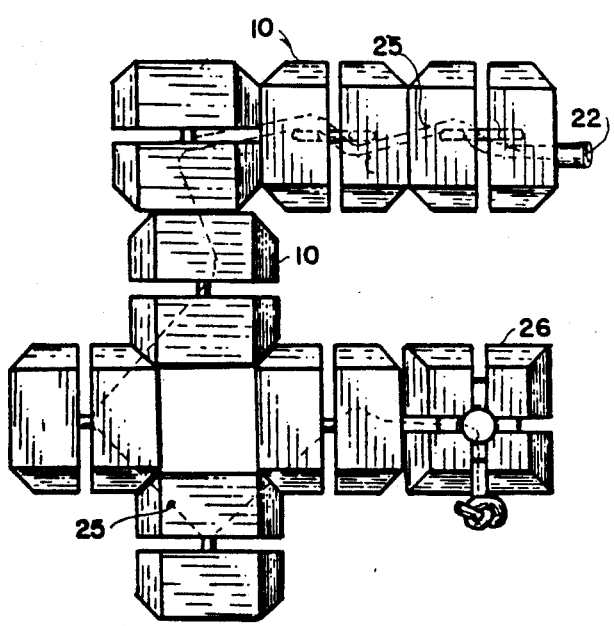
FIG. 3 is a view illustrating a chain of several elastically interconnected blocks.

As shown in FIG. 3, several blocks 10 are interconnected by an elastic cord 22 so that they are drawn together and may be arranged into two and three dimensional designs. In its relaxed or unstretched state the elastic cord 22 has a greater diameter than in its stretched state. Therefore, a longitudinal hole 24 on the axis of the block and the hole through the connecting element 20 should have a diameter slightly larger than the relaxed elastic cord 22 so that the elastic cord may readily be fed through a block. The widths of each of the side and end slots 14, i.e. the spacing between the quarters, should equal the diameter of the elastic cord 22 in its stretched state so that a stretched cord will readily pass through a slot and will be secured when relaxed or released in a slot.

FIG. 3 illustrates, by dashed lines 25, the track of the elastic cord 22 through several blocks 10 formed into a two-dimensional design. The block 26 at one end of the cord is shown rotated a quarter turn so that another block attached to it may, it desired, begin a three-dimensional pattern. This figure shows the end of the cord 22 in its relaxed state. If the cord has been overstretched within the several blocks of the design, the relaxed cord end will have a tendency to be drawn into the slots of block 26. To prevent this loss of a cord end, it may be necessary to further enlarge the diameter of a cord end by inserting an axial wedge into the end of the cord, by adding a terminal in the form of a pin forced diametrically through the cord, or perhaps by tying a simple overhand knot in the end, as shown.

The above describes a cubical block as the preferred embodiment. It is apparent, however, that many other shapes may be used provided they are formed of a plurality of segments having at least two contiguous flat exterior surfaces, the segments being connected together by a connecting element that spaces adjacent segments to provide slots, narrower than the central hole through the washer, for the snug passage of an elastic cord. Similarly, the single strand elastic cord may be replaced with a conventional "closed loop" elastic band that may be threaded through a desired number of blocks and secured at the ends by looping the band ends around segments in the end blocks.

Figure 6:
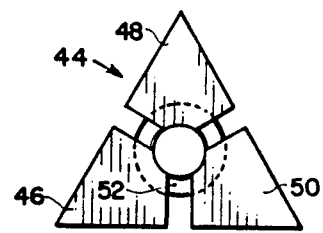
FIG. 6 is a plan view of another design of a block.
Figure 5:
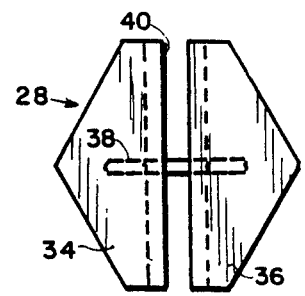
FIG. 5 is a sectional elevational view of the block shown in FIG. 4.
Figure 4:
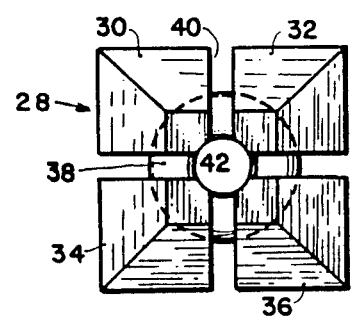
FIG. 4 is a plan view of an alternate design of a block.

FIGS. 4 and 5 illustrate a decahedron block 28 meeting the above requirements. The block 28 contains four segments 30–36 each having a flat exterior surface, the segments being connected together by a washer-like connecting element 38 that spaces the adjacent segments to provide slots 40 narrower than the central hole 42 in the element. The block 44, illustrated in the plan view of FIG. 6, also meets the above criteria with its three segments 46, 48, 50 having flat contiguous surfaces and with the three segments connected together with a connecting element 52 to provide the slots for the elastic cord. It is apparent that blocks having other different shapes or combinations of shapes may also be formed. For example, a block may be formed with two segments having rectangular cross sections connected by a connecting element to a pair of segments having quarter-circle cross-sections. And a top half of a block may be joined to a different shaped lower half.

Figure 7:
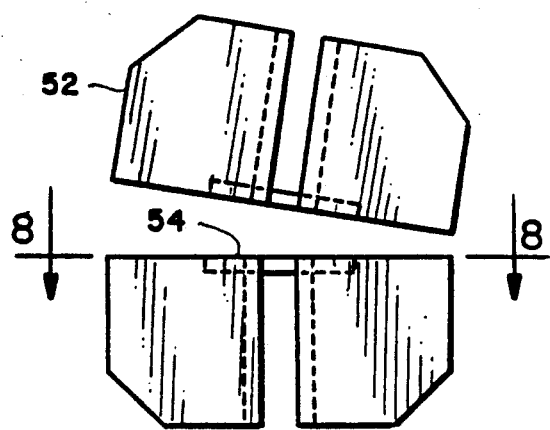
FIG. 7 is an elevational view of a slotted block formed by joining identical upper and lower halves of the block.
Figure 8:
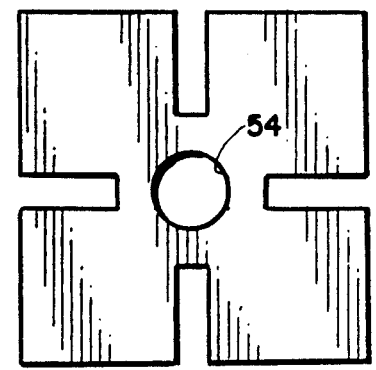
FIG. 8 is a plan view of a half-block taken along the lines 9—9 of FIG. 7.

FIG. 7 is an elevational view of a slotted block being assembled by joining together two halves of a block at the equator. In this embodiment, each half-block contains four segments, such as the segment 52, interconnected at an interior corner by a thin connecting element 54 having a central hole for the free passage of an elastic cord as shown in the plan view of FIG. 8. When the two half-blocks are joined and secured together by appropriate means the block will appear as in FIGS. 1 and 2. An advantage of forming a block by this method is in the mass production of blocks by a plastic injection molding method wherein only two parts are formed per block.

I claim:

1. An elastically interconnected articulated article comprised of a plurality of blocks serially interconnected with elastic means, each block of the plurality having:
   a top surface, a bottom surface, and at least one side surface covering the exterior sides of said block;
   a central hole extending through said block and through said top and bottom surfaces, said central hole having a diameter permitting free passage of the elastic means;
   at least one slot in said block, said slot extending between said top and said bottom and from the center of the exterior side of said block to said central hole; and
   a connector element centrally located within said block and connected thereto in a plane substantially normal to said central hole, said element having a hole coaxial with said central hole in said block and with a diameter permitting free passage therethrough of said elastic means;
   said elastic means is an elastic cord having a first diameter in its unstretched state and a narrower diameter in its stretched state, and wherein said slot has a width that is substantially that of the diameter of said elastic cord in its stretched state.

2. The elastically interconnected articulated article claimed in claim 1 wherein said block is substantially cubical and has four side surfaces each with a centrally located slot open to said central hole and to said connecting element.

3. An articulated article comprised of a plurality of blocks serially interconnected with an elastic cord having a narrower diameter in its stretched state, each block of the plurality comprising:
   a plurality of adjacent segments, each having opposite first and second ends, at least one exterior surface between said first and second ends and representing the exterior of the block, and at least one interior surface between said first and second ends and representing the interior of the block;
   a connecting element receiving slot positioned substantially in the center of said interior surface of each segment of said plurality, said slot being substantially perpendicular to said interior surface; and
   a connecting element secured into said element receiving slots in each segment of said plurality for assembling said segments into said block, said element having a central hole having a diameter for freely passing said elastic cord in its unstretched state, the spacing between adjacent segments forming elastic means receiving slots in the first and second ends and in the exterior surfaces of said block, said spacing being substantially the diameter of said elastic cord in its stretched state.

4. The articulated article claimed in claim 3 wherein said block is a cube having bevelled edges around the first and second ends thereof.

5. The articulated article claimed in claim 3 wherein said elastic cord extending from a block is prevented from entering the slots between adjacent segments by means increasing the diameter of said elastic cord.

6. The articulated article claimed in claim 5 wherein said means for increasing is a knot in the end of said cord.

* * * * *